Figure 1:
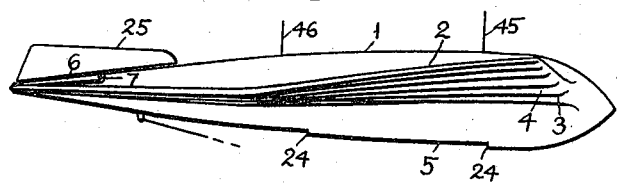

June 9, 1942.　　　L. A. DUNAJEFF　　　2,285,574
AERIAL BOMB
Filed Jan. 31, 1939　　　4 Sheets-Sheet 1

LEONID A. DUNAJEFF
INVENTOR.

BY John P. Nikonow

ATTORNEY.

June 9, 1942.   L. A. DUNAJEFF   2,285,574
AERIAL BOMB
Filed Jan. 31, 1939   4 Sheets-Sheet 2
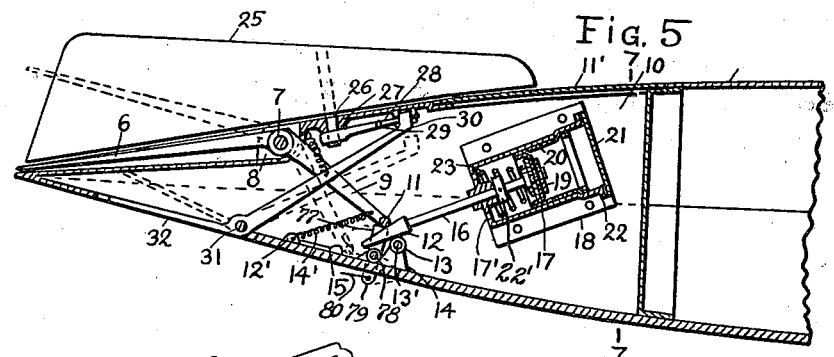
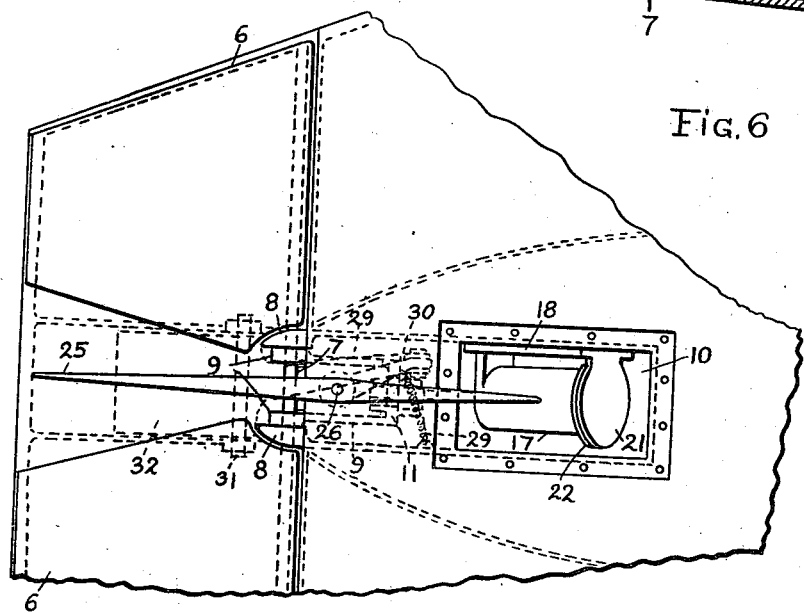
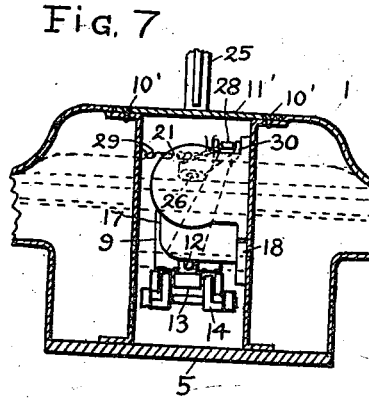
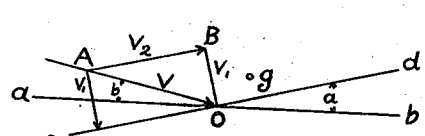
LEONID A. DUNAJEFF
INVENTOR.
BY
ATTORNEY.

June 9, 1942.  L. A. DUNAJEFF  2,285,574
AERIAL BOMB
Filed Jan. 31, 1939  4 Sheets-Sheet 3

LEONID A. DUNAJEFF
INVENTOR.

BY  John P. Wilsonow
ATTORNEY.

June 9, 1942.  L. A. DUNAJEFF  2,285,574
AERIAL BOMB
Filed Jan. 31, 1939  4 Sheets-Sheet 4
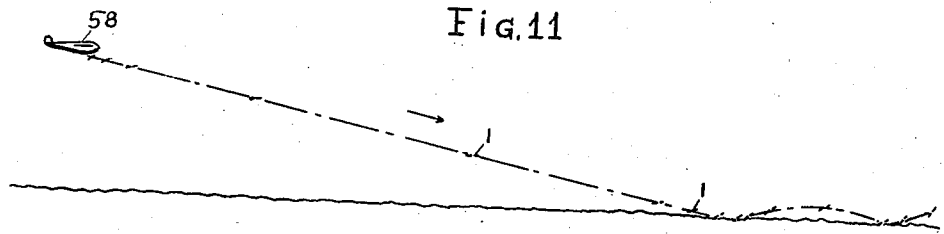
Fig. 11
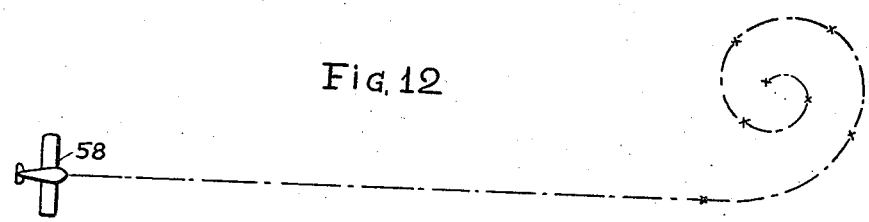
Fig. 12
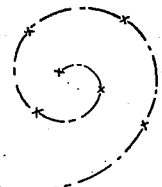
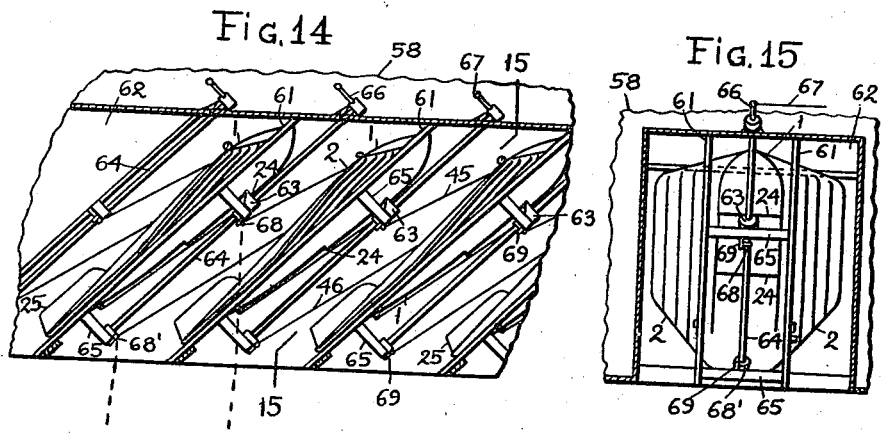
Fig. 14  Fig. 15
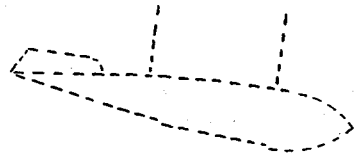
LEONID A. DUNAJEFF
INVENTOR.
BY  John P. Mironow
ATTORNEY.

Patented June 9, 1942

2,285,574

UNITED STATES PATENT OFFICE 2,285,574

AERIAL BOMB

Leonid A. Dunajeff, New York, N. Y., assignor to Joseph Z. Dalinda, New York, N. Y.

Application January 31, 1939, Serial No. 253,745

5 Claims. (Cl. 102—2)

My invention relates to aerial ricochetting torpedoes and has particular reference to torpedoes adapted to be launched from an aircraft toward the surface of the sea.

My invention has for its object to provide a torpedo, which can be used for attacking floating targets on high seas and in ports. For this purpose, my torpedo or bomb is made so that it can descend to the surface of water in a gliding flight at a predetermined constant or variable angle in a manner similar to the disclosure in my copending patent applications Serial No. 209,898, filed May 20, 1938, and No. 242,472, filed November 26, 1938. Such a torpedo, when launched from an airplane flying at a high speed and at a high altitude, can maintain its gliding flight for tens of miles.

Another object of my invention is to provide a missile capable of endangering a large area of ship traffic. My torpedo is so made that it can skip over the surface of water in a series of ricochetting rebounds or leaps. In order to obtain such ricochetting effect, I provide my torpedo with a specially formed body, substantially flat at the bottom and gradually merging into the wings at the front and at the rear with a suitably curved front portion in order to give it an upward jerk at the first impact with the water. I also provide means to control the gliding flight of my torpedo by air pressure so that it will change its angle of incidence near the surface of water into the most favorable inclination for ricochetting.

As a result of this arrangement, my torpedo will rebound from the water, and fly through the air in a parabolic trajectory, descending again to the surface of water for a new rebound, thus continuing its ricochetting flight with successively diminishing leaps. Losses of energy from contacting the surface of water, according to my calculation, will be quite small so that the torpedo will travel for a long distance, comparable to distances traversed by ordinary submarine torpedoes, before its speed will be finally dissipated when it could be made to act as a mine, to sink or explode. It is evident that such a torpedo, when traversing a given area, considering also that it travels in a spiral path, will have much greater chances to strike a target than an ordinary submarine torpedo limited to a straight trajectory.

For higher efficiency while moving through the air, I provide my torpedo with a mechanism for maintaining the proper gliding angle of descent during the flight at higher altitudes, changing this angle at the approach to the sea level. This is conveniently accomplished in my torpedo by the arrangement of an elevator or horizontal rudder which can be set in a position for a predetermined angle of incidence during the flight and by a special aerostatic mechanism which releases the rudder from its fixed position when the air pressure reaches a value corresponding to a predetermined altitude from the sea level. The rudder will then be deflected upward, causing the torpedo to change its angle of incidence.

The best results may be obtained with my torpedo when it is aimed not at any particular target but rather at an area of a more or less large gathering of ships, such as may be found in a harbor or outside in roadways.

In order to still further increase the chances of my torpedo to hit, I provide it with a vertical rudder and a special mechanism for maintaining the rudder in a position for a straight flight while it is still in the air, and for turning the rudder to one side or another upon impact against the surface of water so that my torpedo will describe a spirally curved trajectory in its ricochetting flight among attacked ships. It is evident that this substantially increases the chances of hitting one of the floating targets scattered at a fairly large area.

Another object of my invention is to provide a gyroscopic means for maintaining the torpedo on its course in flight. For this purpose I use a gyroscopic wheel rotatively mounted in a yoke which is suspended on a flexible joint so that the wheel can be deflected in any lateral direction. I also provide resilient means to resist such deviations of the gyroscopic wheel, thereby producing a corresponding pressure on the body of the torpedo, causing it to return to its correct direction. It should be noted that the gyroscopic wheel, because of its rotation, tends to maintain its absolute position in space and forms therefore a fulcrum whose reaction to displacement produces an external force to the body of the torpedo and is capable therefore to turn the body in the space to right position by the springs. The latter are necessary in view of the fact that the deflections of the gyroscope take place in the planes at right angles to the planes of the deviation of the torpedo and it is necessary that the deviation of the gyroscope should actually take place in order to obtain corrective spring pressures.

I also provide means for winding the gyroscopic wheel prior to the dropping of the torpedo, this winding being accomplished while the torpedo is still supported in the fuselage of the airplane similarly to the arrangements disclosed in my foregoing applications. For this purpose the shaft of the wheel may be provided with pulleys or spools for a cord or wire which may be unwound by any suitable arrangement thereby setting the wheel in rotation, as for instance, by weight of the torpedo when it is dropped from the airplane while the outer ends of the cords are held fast in the fuselage.

Another object of my invention is to provide a firing mechanism which will detonate the charge of explosives in the torpedo upon impact against a solid body such as the hull of a vessel, the firing mechanism being normally locked to render it safe for handling prior to the dropping of the torpedo from an airplane, and being automatically armed for action when the gyroscope is fully wound and the torpedo is launched.

Another object of my invention is to provide means for launching my torpedo from an airplane. For this purpose I provide a compartment in the airplane comprising a plurality of inclined guiding rails for my torpedo, the latter being releasably retained on the guides to be successively released one after another.

My invention is more fully described in the accompanying specification and drawings in which—

Figure 2:
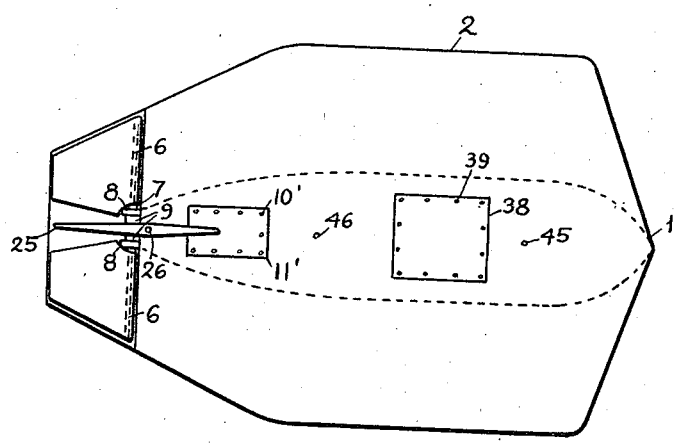
Figure 3:
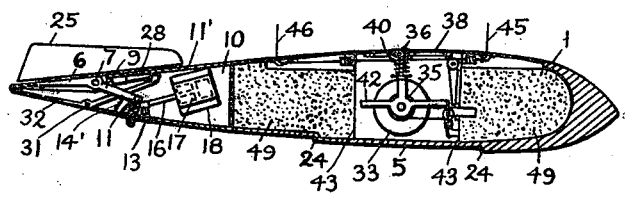
Figure 4:
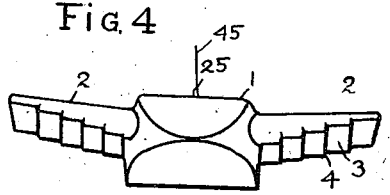
Figure 8:
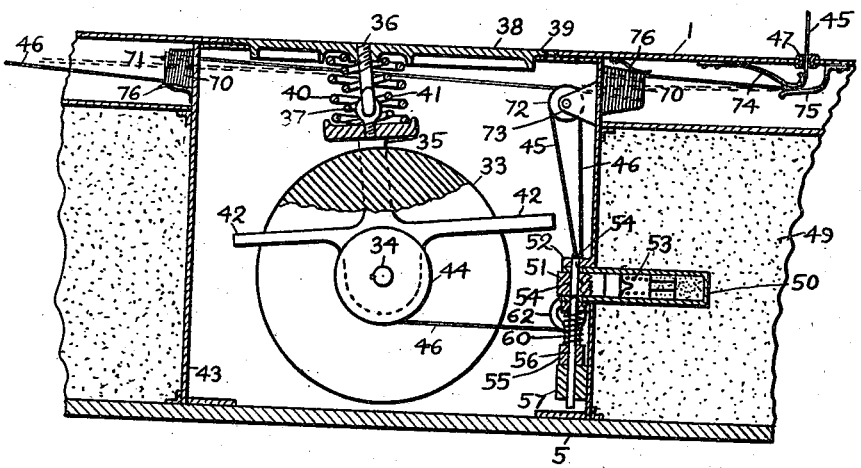
Figure 9:
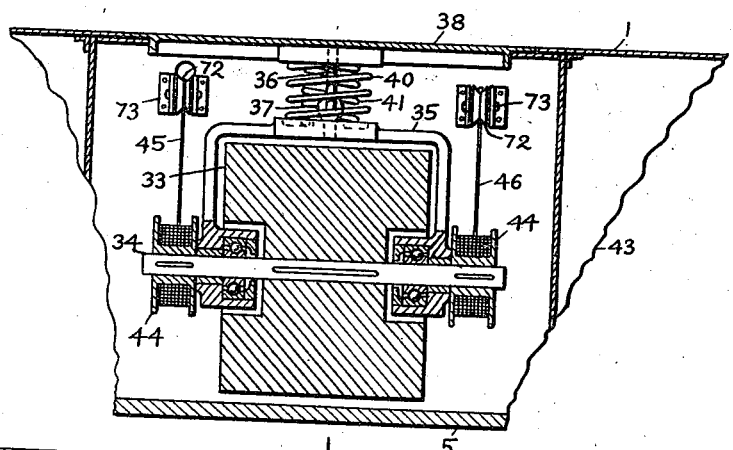
Figure 10:
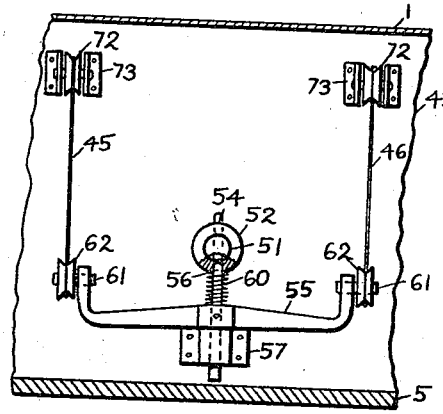

Fig. 1 is an elevational view of my torpedo;
Fig. 2 is a top plan view of the same;
Fig. 3 is a sectional elevational view of the same;
Fig. 4 is a front view of the same;
Fig. 5 is a fractional sectional view of the rear portion of the torpedo;
Fig. 6 is a top plan view of the rear portion of the torpedo;
Fig. 7 is a sectional view taken on the line 7—7 of Fig. 5;
Fig. 8 is a fractional sectional view of the middle portion of the torpedo;
Fig. 9 is a sectional elevational view of the gyroscope;
Fig. 10 is a detail view of the locking device for the firing pin;
Fig. 11 is a diagrammatic view of the trajectory of the torpedo;
Fig. 12 is a plan view of the trajectory;
Fig. 13 is a diagram of forces acting on the torpedo at the moment of the impact with the surface of water;
Fig. 14 is a fractional sectional view of a mechanism for dropping or launching my torpedo from an airplane;
Fig. 15 is a sectional view of the same taken on the line 15—15 of Fig. 14.

My aerial torpedo in one of its preferred forms consists of a body 1 preferably of an elongated streamlined shape, integrally formed with wings 2, Figs. 1 and 2. The wings are made to maintain the torpedo in a gliding descent at a desired angle when the torpedo is released from an airplane flying at its normal high speed. The tips of the wings recede in front (swept back type) so as to leave the front end of the torpedo free for striking a target without interference on the part of the wing tips even when the torpedo should meet the latter at an angle. The under side of the wings may be provided with longitudinal steps 3 and shoulders 4. These steps, together with the flat bottom portion 5, provide substantially horizontal flat surfaces which increase the lift when the torpedo strikes the surface of water and also provide means to stabilize the torpedo in flight by restoring the balance if the body becomes inclined to one side or the other; it is evident that the inclined side will then have a greater supporting surface with the correspondingly greater lift, causing the bomb to turn back into balanced position.

The correct angle of incidence is maintained by means of an elevator or horizontal rudder consisting of two portions 6 mounted on horizontal shafts 7 journaled in bearings 8 at the rear end of the torpedo, joined together by a yoke formed of arms 9 extending from the arms and a cross-bar or bridge 11 extending into a well 10 in the rear end of the torpedo, Fig. 3. The well is closed by a cover 11' fastened in a suitable manner as by screws 10'.

The elevator lies above the rear extension of the body 1, the bridge being engaged by a cam-shaped member 12 resting in turn on a roller 13 supported on a shaft 13'. The latter is mounted in a bracket 14 at the bottom of the well 10. The bridge 11 is pressed against the cam-member 12 by a spring 14' attached by its ends to the bridge 11 and to a bracket 12' respectively. The bracket 12' has an extension 15 limiting the movement of the bridge under action of the spring 14' when the cam-member 12 is withdrawn. The latter forms an extension of a rod 16 sliding in the front cover of a cylinder 17 mounted on a bracket 18 extending from the walls of the well 10. The cover has vent holes 17'. The other end of the rod is connected to a plunger 19 attached to the front end of a flexible air-tight sleeve 20 extending toward the rear end 21 of the cylinder, the other end of the sleeve being clamped against the wall of the cylinder by a clamping ring 22. The cylinder is filled with air preferably at atmospheric pressure and is hermetically sealed. A spring 23 tends to push the plunger into the cylinder thereby moving the cam-shaped member 12 away from the bridge 11. The spring is so adjusted that at the start of the descent, when the airplane is at a high elevation and the air pressure is low, the plunger 19 is moved out, the member 12 pushing the bridge 11 into its extreme outer position. A stop 22' is provided on the rod 16 abutting the cover of the cylinder in order to limit the outward movement of the rod 12 in a rarefied air at high elevations. This arrangement makes it possible to use a relatively short cylinder and a weak spring which will begin to act only at a low elevation of the torpedo. The elevator is thereby set for a desired angle of descent, which may be very small in order to send the torpedo at a relatively great distance, exceeding several times the elevation of the airplane. As the air pressure increases, the cam-member 12 gradually slides forward so that the elevators are gradually raised and further reduce the angle of flight until at the predetermined altitude over the surface of water, the member 12 entirely releases the bridge 11, allowing the latter to be pulled by the spring 14' against the stop 15.

The elevator in this position will cause the front end of the torpedo to be suitably raised so that the torpedo, upon striking the water, will rebound in a ricochetting jump, continuing its forward flight in a series of such ricochetting jumps. The ricochetting flight may continue for a long distance since the loss of energy caused by contact with water is relatively small. In order still further to reduce this loss, the bottom of the torpedo may be provided with steps 24 of a type used in hydroplanes, the steps entraining air and thereby reducing the area of frictional contact with water. It is also possible to operatively connect the rudder arm 9 directly with the rod 16 in order gradually to change the angle of gliding.

The torpedo is also provided with a vertical rudder 25 in order to increase its lateral stability. The rudder is rigidly mounted on a vertical shaft 26 journaled in a bearing 27 and having a rigidly connected arm 28 extending forward in the body 1. The arm is connected with a spring 29 which tends to turn the rudder to one side. The end of the rudder is held in the neutral position with the rudder extending in the axial direction of the body 1 for a straight flight while in the air by the end of a latch 30 pivotally mounted at 31 and connected with a flapper board 32. The latter is exposed on the outside and is adapted to be deflected when the bottom of the torpedo strikes the surface of water, the deflection moving the latch 30 away from the end of the arm 28 and releasing the rudder which then is turned by the spring 29. The result is that the torpedo is forced to change its straight gliding course to a curved path after striking the water in a number of successive ricochetting jumps or leaps forming a spiral trajectory over a relatively large area as shown in Fig. 12. The rudder and the elevators are placed above the flat rear extension of the body in order to protect them against a possible damage when the torpedo strikes the surface of water.

In order to maintain the torpedo while descending on a straight course, it is provided with a gyroscopic wheel 33 mounted on a shaft 34 journaled in the ends of a yoke 35 in an approximately horizontal direction, transversely of the body 1 as shown in Figs. 7 and 8. The yoke is suspended on a link 36 with a universal joint 37 so that the yoke with the wheel can move laterally in all directions. The upper end of the link 36 is attached to the under side of a cover plate 38 which closes an opening in the upper side of the body. The cover is of such size that it can be removed together with the gyroscope and the yoke. It is fastened by screws 39 or by other suitable means. The yoke is resiliently resisted from moving in any lateral direction by two helical springs 40 and 41 wound in the opposite directions and rigidly connected at the ends to the cover and to the yoke respectively so as to resist not only lateral movements of the yoke with the wheel but also its rotation in the horizontal plane. The springs are necessary in order to let the wheel have precessional movements when the body deviates from the straight course, the precessional movements causing corresponding compression of the springs, lateral or torsional, which, when transmitted to the body, tend to return it onto its course. Legs 42 extend from the yoke to the sides of the gyroscope, ending within a short distance from the walls 43 of the gyroscope housing, the object of these legs being to prevent excessive movements of the gyroscope and its damage when the torpedo suddenly suffers a large deviation of its course as, for instance, when striking a water wave. The gyroscope yoke may be also supported on the floor of the body in order to increase its resistance to shocks.

Spools 44 are mounted on the ends of the shaft 34 for wires or cables 45 and 46 which are used for winding the gyroscope, in the following manner: the outer ends of the cables extend to the outside of the torpedo through apertures 47 and are held in the fuselage of an aircraft. Upon release of the torpedo it will remain suspended on the cables while they wind the gyroscope. The inner ends of the cables are not fastened and become released or cut off when fully unwound from the spools. It takes but a few seconds to unwind the cables and to spin the gyroscope so that the cables will not interfere with the subsequent movements of the airplane, being helpful at the start to stabilize the torpedo at the beginning of its flight.

For exploding the charge 49 of explosives in the torpedo, a detonator 50 of a known or other construction is provided supported in the wall 43. A firing pin 51 is slidably fitted in the detonator and in a boss 52 and is restrained by a spring 53. The exposed end of the firing pin has a hole for a locking pin 54 which prevents movements of the pin until the torpedo is released. For releasing the pin or arming the firing pin, a mechanism is provided consisting of a bar 55 with a central rod 56, whose lower end slides in a bracket 57 and the upper end slides in a hole in the bearing boss 52, abutting the lower end of the locking pin 54, the upper end of the rod 56 being of the same diameter as the locking pin 54. The spring 60 normally keeps the arm down against the bracket 57. The ends of the arm have pins 61 for pulleys 62 supporting cables 45 and 46. There will be no tension on the cables while the torpedo is held on its guiding rails and the bar will remain in the lowest position held by the springs 60. Upon release of the torpedo, however, the cables will be subjected to a tension causing the bar 55 to rise. The rod 56 will push the locking pin 54 out, taking its place in the end of the firing pin. The latter will remain locked by the rod 56 until the cables are fully unwound from the spools 44. The springs 60 will then return the bar 55 into its lowest position, withdrawing the substitute pin 56 and releasing or arming the firing pin for action. It will then be free to move by inertia against a fulminate in the detonator 50 for detonating the explosives 49. The front end of the torpedo may be made of specially hardened steel in order to increase its piercing properties.

For launching the torpedoes, the airplane is provided with a special mechanism comprising guiding rails 61 inclined at an angle of approximately 45° to the horizontal axis of the airplane toward its rear as shown in Fig. 14. The rails are arranged in pairs, the rails of one pair being spaced so as to support the torpedo by its wings, the body 1 sliding between the rails. A number of torpedoes can thus be stored in a well 62 in the fuselage of the aircraft 58. The torpedo is supported by a hook 63 engaging the step 24 at the bottom of the torpedo, the hook being mounted on a shaft 64 rotatively supported in brackets 65 extending from the rails 61 under the body of the torpedo. The shaft has an arm 66 on top with a cord or cable 67 extending to a point of control (not shown) in the airplane. By pulling on the cord 67 the shaft can be turned so as to move the hook 63 from under the step 24 thereby releasing the torpedo which is then allowed to slide off the rails 61 and to fall away from the airplane.

The ends of the cables 45 and 46 have loops held by hooks 68, 68' on the shaft 64. The hooks slide in contact with lugs 69 on the brackets 65 so that when the shaft 64 is turned, the lugs 69 force the loops on the ends of the cables off the hooks 68 thereby releasing the cables. This arrangement is necessary in order to release the hanging cables from the airplane thereby preventing the last released torpedo from being tangled up with the cables of the preceding torpedo. With this arrangement it is also possible simultaneously to release several torpedoes.

The apertures 47 for the cables 45 and 46 are spaced apart fore and aft, so that the cables tend to retain the torpedo in the correct position while the torpedo descends during the process of winding the gyroscope. Because of the inclined position of the bars, however, hook 68' is higher than the hook 68 so that it is necessary to provide means to equalize the length of the cables when the torpedo is fully released from the fuselage and starts its gliding descent.

This is accomplished by the provision of equalizing spools 70 supported at the roof of the bomb on brackets 71. The cables 45 and 46 are guided to the spools by pulleys 72 pivotally mounted in brackets 73 at the wall 43. The cables are wound on the spools 70 and 71 with sufficient number of turns to take care of the extra length required for the torpedo to fall free from the airplane when it turns into the gliding position. The front spool 71 holds a larger number of turns than the rear spool 70 to allow for the extra length of the front cable when the torpedo takes its inclined flying position in the air. The cables pass over curved guiding spring 74 directing the cables into the apertures 47. The springs 74 press the cables against stationary frictional members 75 acting as brakes on the cables in order to keep the cables taut while the torpedo slides from the guiding rail and the cables are sliding from the equalizing spools before the gyroscope starts to rotate. The cables then begin to support the weight of the torpedo and cause the gyroscope to gradually acquire rotation. The tension on the cables becomes sufficiently great to deflect the spring 74 from the braking members 75, the curved ends of the springs coming to rest against the roof of the torpedo. The tension of the cables will cause the bar 55 to be raised, pushing the locking pin from the firing pin as was explained above, leaving the firing pin armed when the gyroscope winding process is completed and the cables are unwound from the spools 44. Frictional springs 76 press against the spools 70, preventing the cables 45 and 46 from being prematurely loosened from the spools.

The elevators are locked at the start by a lever 77 (Fig. 5) pivoted at 78 and supporting the bar 11. The lever has a lug 79 extending to the outside through a hole in the bottom of the body 1. A cord 80 is attached to the lug 79, the other end of the cord being attached to the bracket 65 (Fig. 14). The cord turns the lever when the torpedo is released, thereby releasing the elevators. It then breaks off under pull from the torpedo.

As it was already mentioned, the torpedo must approach the surface of water at a certain angle in order to make a ricochetting jump after the impact with water and to continue its flight in a series of such ricochetting jumps. Distribution of forces in a ricochetting action are shown diagrammatically in Fig. 13 where the line $a-b$ represents the surface of water and the line $c-d$ represents the bottom of the torpedo pressed by impact into the water at an angle $a$. The velocity $V$ and direction of movement of the torpedo are represented by a vector $A$ making an angle $b$ with the level $a-b$. The velocity $V$ may be considered as consisting of a component $V1$ in direction normal to the line $c-d$, and a component $V2$ in direction parallel to the line $c-d$. These velocities are related by the equations:

$$V1 = V \sin(a+b) \text{ and } V2 = V \cos(a+b)$$

If $G$ is the weight of the whole torpedo and $g$ acceleration due to the force of gravity, then $$G \frac{V1^2}{2g}$$

will represent a force displacing water in direction normally to $c-d$ while the body penetrates into the water, and $$G \frac{V2^2}{2g}$$

represents a force moving the weight $G$ out of water in direction $c-d$. Since the work of the force $$\frac{V1^2}{2g}$$

is lost in the displacement of water and has no further effect on the movement of the body, the angles $a$ and $b$ become factors of major importance for the movement of the body because they determine the ratio of the energy which is available for jumping or ricochetting to the energy corresponding to the velocity $V$ and with which the body arrives to the surface of water. From the moment of the first contact of the lower portion of the plane $c-d$ with water when the center of gravity $G$ moves over the level $a-b$, the body turns to a smaller angle of inclination on account of rotation of the body when it strikes the water with rear portion first, this angle being further decreased by the loss of speed due to the friction against the surface of water, but increased somewhat on account of upward position of the elevators.

The torpedo will thus jump hundreds of yards and will again continue to travel in a series of ricochetting jumps.

The trajectory of the torpedo is shown diagrammatically in Figs. 11 and 12, the angles and distances being represented not to scale in order to show clearly the character of the flight. The torpedo 1 is shown in Fig. 11 in its different positions, the points of touching the surface of water being represented by crosses in Fig. 12.

*Example.*—A torpedo, arriving at the surface of water at a speed of 100 meters per second and adjusted for landing on the surface at an angle of 10° with angle of incidence at 20°, will rebound into the air and traverse a distance of about 304 meters in its first leap, the highest point of its trajectory being about 13.4 meters. The following jumps will gradually diminish in length and height, the eighth leap, for instance, being about 60 meters, and the total distance covered in a series of ricochetting leaps being about two kilometers. These data have been calculated approximately, neglecting the air resistance, small changes in the angles caused by impact with the water, and the compensating effect of the elevators in the subsequent leap.

It should be noted that the gyroscope, in order to help the torpedo in its spiral flight, must rotate in a corresponding direction. Thus, for instance, if the rudder is set for a left-hand spiral, the gyroscope must rotate rearwardly looking at it from the top.

It may be mentioned that this principle of the spiral movement may be also applied to my other aerial torpedos as described in my foregoing applications.

I claim as my invention:

1. An aerial torpedo comprising an elongated body and wings, adapted to descend in a forward gliding flight at a small angle of inclination to the horizon when dropped from an aircraft, an elevator movably supported on the body, yieldable means to turn the elevator into an inclined position with its rear end raised, releasable means for locking the elevator in position for a gliding descent, and means responsive to atmospheric pressure for releasing the elevator from locked position at slightly above sea level, thereby causing the elevator to turn into an inclined position for raising the front end of the body prior to impact of the body with the surface of water into a position of small angle of incidence with the water surface favorable for a ricochetting rebound of the torpedo upon impact with water.

2. An aerial torpedo comprising an elongated body and wings, adapted to descend in a forward gliding flight at a small angle of inclination to the horizon when dropped from an aircraft, an elevator movably supported on the body, a spring urging the rear end of the elevator upward, releasable means for locking the elevator in position for a gliding descent, and means responsive to atmospheric pressure for releasing the elevator from locked position at slightly above sea level, thereby causing the elevator to turn into an inclined position for raising the front end of the body prior to impact of the body with the surface of water into a position of small angle of incidence with the water surface favorable for a ricochetting rebound of the torpedo upon impact with water.

3. An aerial torpedo comprising an elongated body and wings, adapted to descend in a forward gliding flight when dropped from an aircraft, a charge of explosives in the torpedo, a firing pin for the explosives, means to lock the firing pin in its inoperative position, a gyroscope rotatively supported in the body, means to wind the gyroscope, and means to release the firing pin locking means by the gyroscope winding means.

4. An aerial torpedo comprising an elongated body and wings, adapted to descend in a forward gliding flight when dropped from an aircraft, a charge of explosives in the torpedo, a firing pin for the explosives, means to lock the firing pin in its inoperative position, a gyroscope rotatively supported in the body, a pulley on the gyroscope adapted to receive a cord for spinning the gyroscope, a resilient yieldable support for the cord, and means to release the firing pin locking means by the yieldable support when a pulling force is applied to the cord for spinning the gyroscope.

5. An aerial torpedo comprising an elongated body and wings, adapted to descend in a forward gliding flight at a small angle of inclination to the horizon when dropped from an aircraft, an elevator movably supported on the body, a rudder movably supported on the body, yieldable means to turn the rudder to one side, means to lock the rudder in a neutral position, and means to release the rudder locking means by the impact of the body against the water, thereby allowing the rudder to be turned to one side by the yieldable means.

LEONID A. DUNAJEFF.